(12) United States Patent
Paturle

(10) Patent No.: US 8,833,410 B2
(45) Date of Patent: Sep. 16, 2014

(54) TYRE WITH SOUND WEAR INDICATORS

(75) Inventor: Antoine Paturle, Pont-du-Chateau (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 313 days.

(21) Appl. No.: 13/127,749

(22) PCT Filed: Oct. 27, 2009

(86) PCT No.: PCT/FR2009/052071
§ 371 (c)(1),
(2), (4) Date: Jul. 5, 2011

(87) PCT Pub. No.: WO2010/052409
PCT Pub. Date: May 14, 2010

(65) Prior Publication Data
US 2011/0259490 A1    Oct. 27, 2011

(30) Foreign Application Priority Data
Nov. 6, 2008 (FR) ...................................... 08 57558

(51) Int. Cl.
*B60C 11/24* (2006.01)
(52) U.S. Cl.
CPC ..................................... *B60C 11/24* (2013.01)
USPC ................... 152/154.2; 152/209.22; D12/901
(58) Field of Classification Search
USPC ................. 152/154.2, 209.22, 209.2, 209.25, 152/209.18, 209.17; D12/901
IPC ........................................................ B60C 11/24
See application file for complete search history.

(56) References Cited

U.S. PATENT DOCUMENTS

| D62,952 S   | * | 8/1923  | Holloway ..................... D12/577 |
|-------------|---|---------|----------------------------------------|
| D64,833 S   | * | 6/1924  | Belden ......................... D12/534 |
| 3,727,661 A |   | 4/1973  | Hoke ............................ 152/209 |
| 5,622,575 A |   | 4/1997  | Meyer-Adlung et al. ..... 152/209 |
| 2006/0005904 A1 | | 1/2006 | Helt et al. ................... 152/154.2 |
| 2006/0016538 A1 | | 1/2006 | Miyazaki ................. 152/209.22 |
| 2008/0023116 A1 | * | 1/2008 | Mayni et al. ............... 152/154.2 |

FOREIGN PATENT DOCUMENTS

| EP | 0 686 517 A1 | 12/1995 | | |
| EP | 0 936 088 A2 | 8/1999 | | |
| FR | 1 480 472 A  | 5/1967 | | |
| JP | 8-207515 A   | 8/1996 | | |
| JP | 08207515 A   | * | 8/1996 | ............. B60C 11/24 |
| JP | 09193621 A   | * | 7/1997 | ............. B60C 11/24 |

* cited by examiner

Primary Examiner — Justin Fischer
Assistant Examiner — Philip N Schwartz
(74) Attorney, Agent, or Firm — Fitzpatrick, Cella, Harper & Scinto

(57) ABSTRACT

A tire includes a tread strip configured in such a way that, beyond a predetermined radial wear threshold, at least one pair of first and second sounding cavities is exposed. Each first and second sounding cavity is arranged respectively in a first and second circumferential groove of the tread strip. Each sounding cavity of the pair is connected to the other sounding cavity of the pair by a sounding channel formed in the tread strip. Each cavity of the pair and the associated channel:
 open radially to the outside of the tyre, and
 are configured so that they are closed by a ground surface in a substantially airtight manner as they pass through a contact patch where the tyre makes contact with the ground surface.

16 Claims, 3 Drawing Sheets

Figure 3:
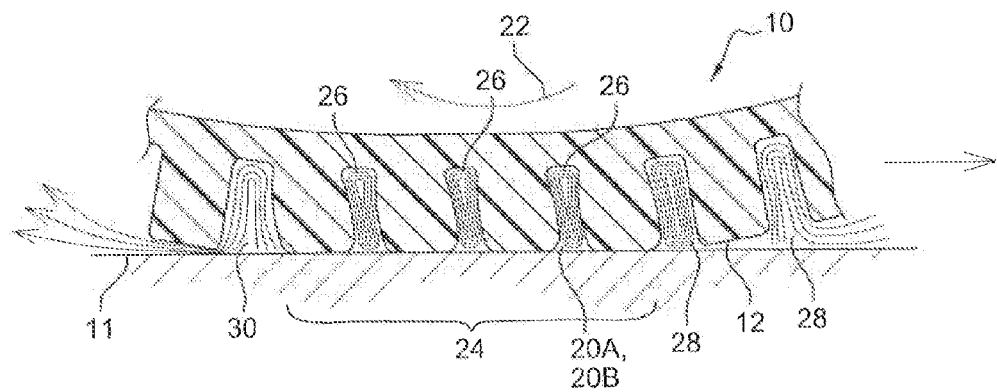

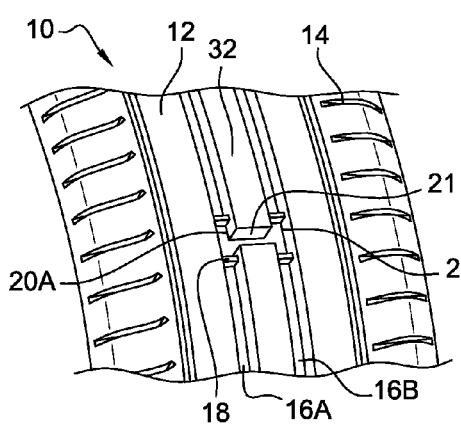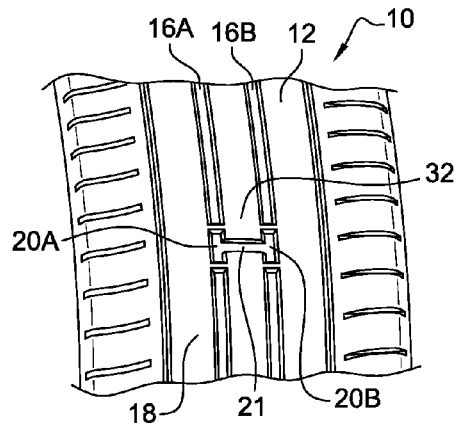
Fig. 1     Fig. 2
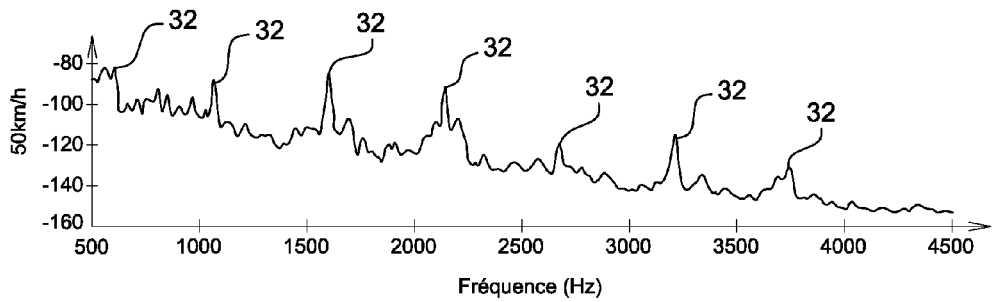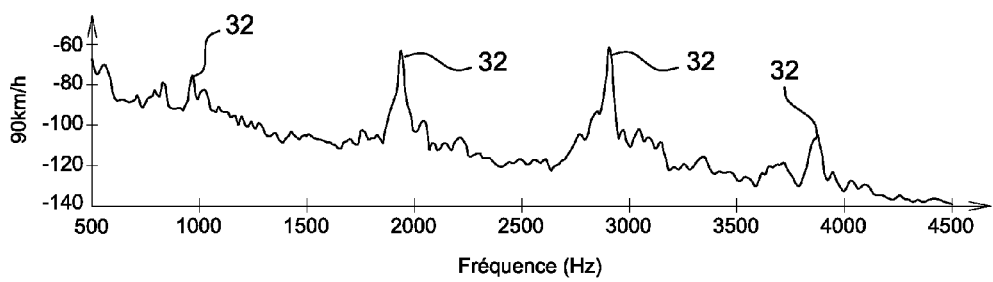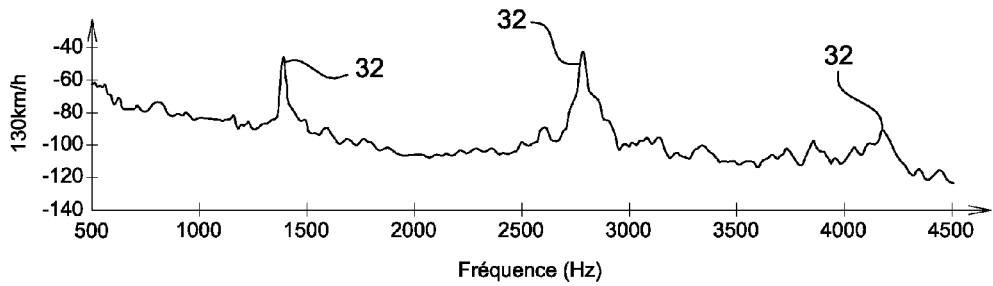
Fig. 4

TYRE WITH SOUND WEAR INDICATORS

The invention relates to the field of motor vehicle tyres and how their level of wear is detected.

As a tyre runs over ground, its tread strip, which is in contact with the ground, becomes worn through friction.

For obvious safety reasons it is important to replace a tyre before the wear of its tread strip becomes too great and carries the risk of causing problems of grip on wet ground.

To make it easier to check for wear and to detect excessively pronounced wear, tyres are commonly equipped with tread wear indicators.

One example of a tread wear indicator commonly used is a rib created in the bottom of a groove of the tread pattern of the tyre and the height of which corresponds to the minimum depth of tyre groove needed for the tyre to operate correctly and reliably. Thus, when the tyre tread strip has become worn and the top of the rib comes flush with the exterior surface of the tread strip, that means that the minimum depth tolerated for groove depth has been reached, or even passed. It is therefore urgent for the tyre to be replaced for safety reasons.

One disadvantage with this type of tread wear indicator is that it requires vigilance on the part of the driver of the motor vehicle and a regular visual inspection of the condition of his tyres. Now, many drivers omit to perform such checks and change their tyres too late, for example when, during compulsory vehicle testing at a garage, the state of wear of the tyres is checked.

It is a notable object of the invention to provide a tyre equipped with a new type of wear indicator which is more effective and more dependable.

To this end, an aspect of the invention is a vehicle tyre that includes a tread strip configured in such a way that, beyond a predetermined radial wear threshold, the tread strip includes at least one pair of first and second cavities known as "sounding cavities", each first and second sounding cavity being arranged respectively in a first and second circumferential groove of the tread strip, each sounding cavity of the pair being connected to the other sounding cavity of the pair by a channel known as a "sounding channel" formed in the tread strip, each cavity of the pair and the associated channel:

opening radially to the outside of the tyre, being configured so that they are closed by the ground in a substantially airtight manner as they pass through the contact patch where the tyre makes contact with the ground.

Thanks to the invention, when the tyre has been worn beyond a wear threshold that is considered to be dangerous, one or more pairs of sounding cavities and one or more associated sounding channels appear, i.e., are exposed, on the tread strip.

These cavities and the associated channel have a special shape, which gives them sounding or acoustic properties, that is to say that these cavities and the associated channel give rise to a characteristic noise when driving on the worn tyre.

Specifically, because the pair of cavities and the channel connecting them to one another are configured so that they are closed by the ground in a substantially airtight manner, the air is temporarily trapped as the pair of cavities and the channel pass through the contact patch where the tyre makes contact with the ground. Now, under the effect of the deformation of the tyre in the contact patch, this air trapped in the pair of cavities and the associated channel becomes compressed and then expands suddenly on leaving the contact patch when the tread strip breaks contact with the ground at the rear of the tyre and the pair of cavities and the associated channel therefore become open.

This expansion of the air lasts of the order of a few milliseconds and gives rise to a specific noise, sometimes known as hissing or air pumping noise, which is dependent notably on the shape and volume of the pair of cavities and of the associated channel.

This characteristic noise, which appears only when the tyre has worn beyond a certain threshold, thus forms an audible wear indicator. Thus, even if the driver does not regularly and visually inspect the surface condition of his tyres, he will be informed of the excessive wear of his tyres when, while driving, he hears this characteristic hissing noise.

Because of the location within the grooves, the noise emitted by the cavities and the associated channel is amplified by comparison with the noise that would be heard if the audible wear indicators were located elsewhere in the tread strip. The noise emitted is also amplified by a horn formed by the tyre and the ground once the cavities and the associated channel have passed through the contact patch. This amplification through a horn effect is at its maximum when the sounding cavities are preferably arranged axially in a central part of the contact patch of the tyre.

What is meant by a central part of the contact patch is that region of the contact patch which extends axially over substantially half the width of this contact patch under nominal pressure and loading conditions and is centred relative to the central median plane of the tyre.

Further, the sounding cavities may degrade the performance of the tyre by comparison with a tyre that has no such sounding cavities, particularly in terms of the ability of the grooves to clear water. The channel connecting the cavities of each pair is able to compensate for this loss of performance while at the same time allowing the degree of wear of the tyre to be detected.

The shape and volume of the sounding cavities and of the associated channel are determined so that the frequency and intensity of the noise produced by the pair of cavities and the associated channel passing through the contact patch makes this noise audible to the driver from the cabin of the vehicle.

In order to detect this hissing noise it is also possible to use one or more road noise detection microphones connected to a computer capable of discerning the hissing noise in and amongst the road noise and of informing the driver of the state of wear of his tyres.

Given that this hissing phenomenon occurs only when air is compressed in the pair of cavities and the associated channel and then expands as it escapes therefrom, it is important for the pair of cavities and the associated channel to be closed in a substantially airtight manner by the ground as they pass through the contact patch. Specifically, cavities or a channel the top of which is covered by the ground but which, in addition, might include transverse channels in fluidic communication with the external air, would not form sounding cavities or a sounding channel because the air they or it contain(s) would not be able to be compressed. This is notably the case with regard to the tread patterns of tread strips of tyres of the prior art, which are generally formed of a network of channels causing the various cavities to communicate with one another and with the external air.

Likewise, cavities or a channel of dimensions that make it or them too large for the ground to be able completely cover them as they pass through the contact patch, for example cavities or a channel of a length in excess of the length of the contact patch, would not be able to form sounding cavities or a sounding channel within the scope of aspects of the invention.

A tyre according to an embodiment of the invention may further include one or more of the following features:

The cavities of the pair are substantially aligned axially with one another.

Before the predetermined wear threshold is reached, notably when the tyre is new, the tyre includes no pair of sounding cavities and no associated sounding channel. Thus, the characteristic hissing as the sounding cavities and associated sounding channel pass through the contact patch occurs only when the tyre wear has exceeded the predetermined threshold. Thus, during the normal service life of the tyre, no audible signal is heard. The first hissings do not appear until the tyre wear is such that at least one pair of sounding cavities and the associated sounding channel have come into evidence or are exposed on the tread strip of the tyre.

The pair of sounding cavities and the associated sounding channel include a mouth defined by a contour formed on the tread strip, the contour being substantially planar so that the pair of cavities and the associated sounding channel can be closed in a substantially airtight manner by flat ground. In other words, the pair of cavities and the associated sounding channel can be closed in a simple way by the ground because they do not include any channels opening onto various surfaces of the tread strip, for example onto the inside of tread blocks formed in the tread strip.

With each first and second groove having a predetermined depth when the tyre is new, the tread strip includes at least two ribs formed transversally at the bottom of each first and second groove, these two ribs being of a predetermined height when the tyre is new, this height being substantially equal to a difference between the predetermined depth of each first and second groove and the predetermined wear threshold, the tyre being such that a distance separating the two ribs is smaller than a predetermined distance so that, beyond the predetermined radial wear threshold, each cavity formed by each groove and delimited by the two ribs, is a sounding cavity. In the prior art, visual wear indicators are also formed by ribs formed at the bottom of circumferential grooves of the tyre. However, these visual wear indicators are generally six to eight in number so that the ribs are very far apart. Thus, the distance separating two adjacent ribs is far greater than the length of the contact patch where the tyre makes contact with the ground and at no time are two adjacent ribs ever simultaneously in contact with the ground. Thus, in the prior art, the volume defined by the groove and delimited by two adjacent ribs admittedly forms a cavity but this cavity is not a sounding cavity because it cannot be closed in a substantially airtight manner by the ground.

The distance separating the two ribs is greater than 15 millimeters and less than 50 millimeters. Because this distance is much shorter than the length of the contact patch, it is possible to be sure that the cavities delimited by these two ribs and the associated channel can be closed in an airtight manner by the ground.

Beyond the predetermined radial wear threshold, the total volume of the pair or pairs of sounding cavities and of the associated sounding channel or channels is greater than or equal to 4 cm$^3$, and is 5 cm$^3$ in an embodiment of the invention. Such a cavity volume is needed in order that, as it passes through the contact patch, the intensity of hissing is great enough that it can be distinguished from among the rest of the road noise that the tyre makes along the ground and the engine noise and noises of the drive train associated therewith. Further, this value is low enough to allow cavities to be created in a conventional tyre without appreciably deteriorating its performance.

When the tyre is new, the cavities are closed and embedded within the mass of the tread strip and, beyond the predetermined radial wear threshold, the channel connects the cavities of the pair so that the cavities and the associated channel become sounding cavities and a sounding channel. These cavities are therefore not visible on a new tyre but come into evidence as the tyre gradually becomes worn.

When the tyre is new, the channel is closed and embedded within the mass of the tread strip and, beyond the predetermined radial wear threshold, the channel connects the cavities of the pair so that the cavities and the associated channel become sounding cavities and a sounding channel.

The tread strip is configured in such a way that, beyond the predetermined radial wear threshold, it includes a plurality of pairs of sounding cavities and of associated sounding channels of identical shapes, each sounding cavity of each pair being connected to the other sounding cavity of the pair by an associated sounding channel formed in the tread strip.

Beyond the predetermined radial wear threshold, the pairs of sounding cavities and the associated sounding channels are evenly distributed along the circumference of the tyre. The uniform circumferential distribution of the pairs of cavities and associated sounding channels makes it possible to obtain an even distribution in time of the noise emitted by each pair of cavities when the tyre is running at constant speed. When the tyre includes just one pair of cavities and one associated channel, this also allows an even distribution in time of the noise emitted when the tyre is being driven at a constant speed. The noise emitted by such evenly distributed cavities and channels is unique and can therefore be identified and analysed using a suitable detection process.

Beyond the wear threshold, the tyre includes two pairs of cavities and two associated channels, or even four pairs of cavities and four associated channels. For tyre manufacturing reasons and for reasons of compatibility with the tread patterns of the tread strip, it is advantageous to reduce the number of pairs of cavities and of associated channels as far as possible without deteriorating the possibility of detecting tyre wear.

Figures 5A, 6:
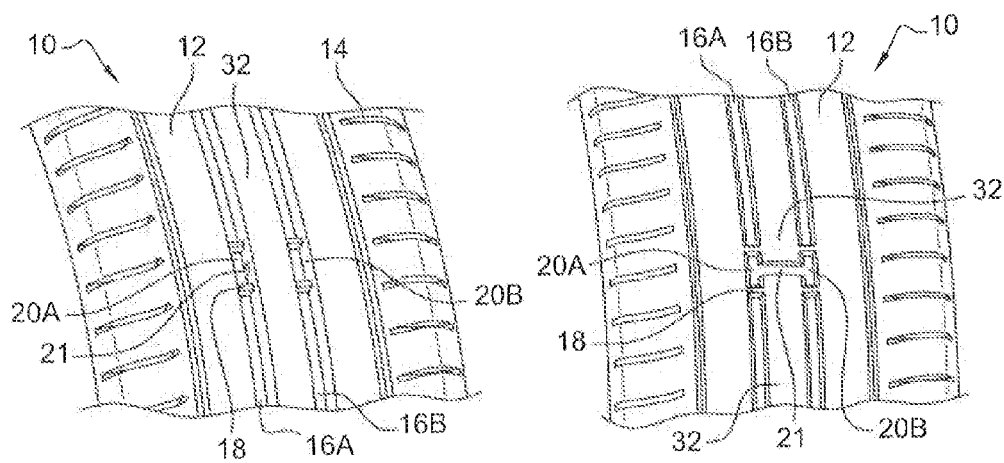
Figure 5B:
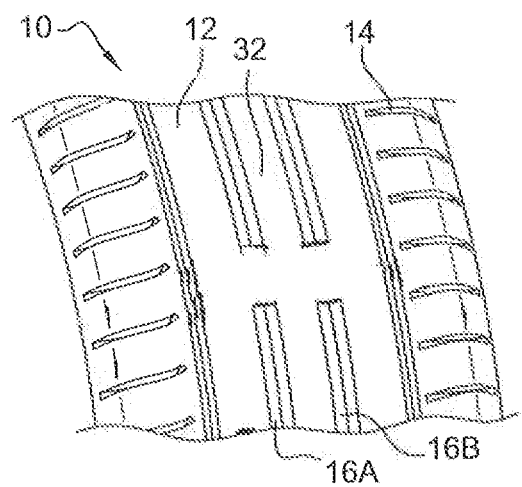

The invention will be better understood from reading the following description, given solely by way of example, and made with reference to the drawings in which:

FIG. 1 is a diagram of a tread strip of a new tyre according to a first embodiment, FIG. 2 is a diagram of the tread strip of the tyre depicted in FIG. 1, in a worn condition, FIG. 3 is a diagram in radial section of the tread strip of the tyre depicted in FIG. 2, FIG. 4 includes three graphs depicting a frequency spectrum of sound produced as a vehicle equipped on its front axle with two tyres similar to that of FIG. 2 drives over smooth ground at three different speeds, FIGS. 5A, 5B, and 6 are figures with features similar to FIGS. 1 and 2 but of a tyre according to other embodiments.

FIG. 1 depicts part of a tyre according to a first embodiment of the invention, denoted by the general reference 10.

The tyre 10 includes a tread strip 12 of substantially cylindrical shape, an exterior surface of which is equipped with tread patterns 14. In particular, the tread strip 12 includes first and second circumferential and parallel grooves 16A, 16B cut into the surface of the tyre, and of a predetermined depth when the tyre 10 is new. For example, the depth of these grooves 16A, 16B is of the order of 8 millimeters for a passenger car.

Running transversally to the grooves 16A, 16B, the tread strip 12 of the tyre 10 includes a set of ribs 18 formed at the bottom of the grooves 16A, 16B, the height of the ribs 18 being predetermined when the tyre is new. For example, the height of these ribs 18 is of the order of 3 millimeters. In the example depicted in FIG. 1, the ribs 18 are uniformly distributed along the entire circumference of the tyre 10, the distance separating two adjacent ribs being of the order of 20 to 30 millimeters.

The tread strip 12 also includes a pair of first and second cavities 20A, 20B, respectively arranged in the first and second grooves 16A, 16B and a transverse channel 21 associated with the pair of cavities 20A, 20B. The channel 21 is formed in the strip 12 and connects the cavities 20A, 20B together.

The cavities 20A, 20B are axially aligned. As an alternative, they are axially offset from one another.

The volume defined by each groove 16A, 16B and two adjacent ribs 18 respectively forms each cavity 20A, 20B opening radially to the outside of the tyre 10. The channel 21 also opens to the outside of the tyre 10.

When the tyre is new, as depicted in FIG. 1, the height of the ribs 18 is smaller than the depth of the grooves 16, which means that the two adjacent cavities 20A, 20B include a fluidic communication passage situated above the ribs 18, that is to say on top of the ribs 18. Thus, even when the tread strip 12 is in contact with flat and smooth ground 11, the ground 11 does not completely close off the cavities 20A, 20B because the top of the ribs 18 is not in contact with the ground 11. In such a case, the various adjacent cavities 20A, 20B are in fluidic communication with one another via a restriction channel delimited by the tops of the ribs 18 and the ground 11 that covers the cavities, or alternatively by the channel 21.

FIG. 2 depicts the tyre 10 of FIG. 1 in a worn condition. In other words, this is a tyre that has covered a great many kilometers and the tread strip 12 of which has progressively become worn until it has lost a few millimeters, of the order of 5 mm.

In this particular instance, the amount of wear of the tread of the tyre 10 in FIG. 2 is of the order of 6 mm, that is to say more than the distance which, when the tyre was new, separated the tops of the ribs 18 from the surface of the tread strip 12. Given this advanced wear, the tops of the ribs 18 are at the same level as the surface of the tread strip 12. Thus, the mouth of each cavity 20A, 20B and of the channel 21 is defined by a substantially planar contour formed on the tread strip 12. Each pair of cavities 20A, 20B and the channel 21 associated therewith are distinct and separated from one another.

Each cavity 20A, 20B has a length of the order of 20 to 30 millimeters corresponding to the circumferential distance between two adjacent ribs 18 at a depth of the order of 2 millimeters, less than or equal to the initial height of the rib 18. The tyre 10 includes two pairs of sounding cavities 20A, 20B and two associated transverse channels 21, which are diametrically opposite so that the pairs of cavities 20A, 20B and the associated channels 21 are evenly distributed along the circumference of the tyre 10. The pairs of cavities 20A, 20B and the channels 21 are of identical shapes.

Beyond the predetermined radial wear threshold, the total volume of the pairs of sounding cavities 20A, 20B and of the associated sounding channels 21 is greater than or equal to 4 cm³, and in an embodiment is 5 cm³.

Because the mouth of each cavity 20A, 20B and of the channel 21 is defined by a substantially planar contour, it can be perfectly and hermetically closed off by smooth flat ground during running. In other words, when the tyre 10 is worn, the cavities 20A, 20B and the channel 21 are configured such that they can be closed by the ground in a substantially airtight manner as they pass through the contact patch where the tyre 10 is in contact with the ground.

Such cavities 20A, 20B and such an associated channel 21, which are formed at the surface of the tread strip 12 of a tyre 10, that, on the one hand, open radially to the outside of the tyre and, on the other hand, are configured so that they can be hermetically closed as they pass through the contact patch, can be termed "sounding cavities".

It is possible to conceive of various sizes of cavity or various orientations of these cavities 20A, 20B with respect to the tread strip 12.

In a tyre according to an embodiment of the invention, such sounding cavities come into evidence, i.e., are exposed, only when the tyre 10 has worn beyond a predetermined radial wear threshold and do not exist before this threshold is reached, notably when the tyre 10 is new.

One way of causing the sounding cavities to come into evidence only when the tyre 10 has been worn beyond a predetermined threshold has been described with reference to FIGS. 1 and 2. Another way may be to create on the tyre 10 a pair of cavities 20A, 20B that, when the tyre 10 is new, are closed and embedded in the mass of the tread strip and that, beyond a predetermined radial wear threshold, become sounding cavities.

FIG. 3 depicts a view in radial section through a tyre 10 similar to that of FIG. 2 running along the ground. The dimensions have been altered arbitrarily to make the description clearer. This tyre 10 is in worn condition and therefore includes a set of sounding cavities 20A, 20B and of associated channels 21.

The direction of rotation of the tyre 10 as it runs along the ground has been indicated by an arrow 22. At a given moment, part of the tread strip 12 of the tyre 10 is in contact with the ground. This part that is in contact is known as the contact patch 24. The cavities 20A, 20B of each pair are positioned axially in a central part 32 of the contact patch 24 of the tyre 10, which is formed by part of the circumferential tread strip 12 of the tyre 10.

In the example depicted in FIG. 3, the contact patch 24 includes three pairs of sounding cavities 26 and three associated sounding channels the radially exterior mouths of which are covered by the ground 11. Thus, these three pairs of sounding cavities 26 and their associated sounding channels are hermetically closed.

The contact patch 24 of the tyre 10 also includes pairs of sounding cavities 28 and their associated sounding channels that are located ahead of the pairs of closed cavities 26 and their associated channels, and that are open because their mouths are not in the contact patch 24 and therefore not covered by the ground. As the tyre 10 runs in the direction denoted by the arrow 22, the pairs of open cavities 28 and their associated channels will progress towards the contact patch 24 until their mouths are closed off by the ground 11.

Finally, the tread strip 12 of the tyre 10 also includes pairs of cavities 30 and their associated channels that are situated behind the pairs of cavities 26 and associated channels and that are closed, with respect to the direction of rotation of the tyre. In the example depicted in FIG. 3, the pair of cavities 30 and the associated downstream channel are depicted as open because the ground 11 is not in contact with their mouths. Prior to that, this pair of cavities 30 and the associated channel were closed because they were situated in the region of the contact patch 24 where the tyre was in contact with the ground 11.

Thus, as the tyre 10 is driven along, one given pair of sounding cavities 20A, 20B and the given associated sounding channel successively occupy an upstream position (e.g., at 28) in which they are open, then a position (e.g., at 26) located in the contact patch 24 and in which they are closed because they are covered by the ground, then finally an open position (e.g., at 30) again in which they are no longer covered by the ground.

In other words, the rotation of the tyre 10 causes, for a given pair of cavities and a given associated channel, air to be admitted into the pair of cavities and associated channel, the air contained in the pair of cavities and in the associated channel to be compressed as these cavities and this channel are closed by the ground in the contact patch 24, then the expansion of the air contained in the pair of cavities of the associated channel as these become open as a result of the tread strip separating from the ground.

This succession of admission/compression/expansion steps is the cause of a characteristic noise, sometimes known as hissing or air pumping noise resulting from the expansion of the compressed air contained in the pair of cavities and the associated channel. The amplitude and the frequency signature of this noise are notably dependent on the shape, the volume and the number of pairs of sounding cavities and of associated sounding channels used. For preference, the pairs of cavities and of associated channels are configured so that this noise can be detected by a user of the motor vehicle or by an electronic device.

The frequency signature of the hissing noise of the pairs of cavities and of the associated channels is also dependent on the rotational speed of the tyre 10, as depicted in FIG. 4.

Measurements recorded on a smooth track were recorded using a BMW 318d fitted at the front with two test tyres similar to the tyre 10 of FIG. 2, and fitted at the rear with two standard MICHELIN Primacy HP tyres. The size of the four tyres was 205/55R16. The noise in the cabin of the vehicle was recorded. The test tyres had two rows of 75 sounding cavities.

FIG. 4 includes three graphs each depicting a frequency spectrum of the signal produced at 50 kilometers/hour, 90 kilometers/hour, and 130 kilometers/hour. The scale on the ordinate axis is arbitrary.

It may be seen from these three frequency spectra that, for a given tyre speed, it is possible to discern the appearance of a plurality of spikes 32 that are characteristic of the hissing noise of the pairs of sounding cavities and of associated sounding channels created at the surface of the tyre 10.

The frequency position and the distances between the spikes are dependent notably on the speed of the vehicle.

In addition, the signal/noise ratio of these spikes varies according to the type of surface on which the tyre 10 is being driven. Specifically the rougher the road surface, the greater the road noise and the lower the signal/noise ratio. Moreover, it is found that, when the road surface is rough, the pairs of cavities and associated channels contained in the contact patch 24 where the tyre 10 makes contact with the ground are not closed off as hermetically which means that the acoustic intensity of the hissing is lower.

As a result, under normal driving conditions, it is easy to detect the frequency spikes that are due to the presence of the pairs of sounding cavities and associated sounding channels on the tread strip 12 of the tyre 10 using appropriate digital processing.

Thus, by regularly checking the tyre road noise it is possible to detect the onset of these frequency spikes, which means that one or more pairs of sounding cavities and associated sounding channels have come into evidence at the surface of the tyre. Now, the presence of pairs of sounding cavities and of associated sounding channels at the surface of the tyre 10 indicates that the tread strip of the latter has become worn. The tyre 10 according to an aspect of the invention is therefore equipped with sound or audible wear indicators.

FIGS. 5A, 5B, and 6 depict a tyre 10 according to other embodiments of the invention. Elements similar to those of the first embodiment depicted in the preceding figures are denoted by identical references.

Unlike in the first embodiment, when the tyre 10 is new, the cavities 20A, 20B and the channel 21 are embedded within the mass of the tread strip 12 (FIG. 5B), and, beyond the predetermined radial wear threshold, the channel 21 connects the cavities 20A, 20B of the pair so that the cavities 20A, 20B and the associated channel 21 become sounding cavities and a sounding channel (FIG. 6). In the embodiment shown in FIG. 5A, the channel 21 is embedded in part of a circumferential strip 32 of rubber interposed between the grooves 16A, 16B forming an axially centred part of the contact patch 24.

The invention claimed is:

1. A vehicle tyre comprising a tread strip,
    wherein, before a predetermined wear threshold is reached:
        the tread strip includes first and second cavities and a channel that are not closed by a ground surface in an airtight manner when a contact patch including the first and second cavities and the channel makes contact with the ground surface, and
    wherein, when the predetermined wear threshold is reached:
        the first cavity, the second cavity, and the channel become respectively a first sounding cavity, a second sounding cavity, and a sounding channel that are exposed on the tread strip, such that:
            each of the first and second sounding cavities is arranged respectively in a first circumferential groove and a second circumferential groove of the tread strip, and the first and second sounding cavities being arranged respectively on first and second sides of a central median plane of the tyre,
            the first and second sounding cavities are connected to each other by the sounding channel, which crosses the central median plane of the tyre,
            each of the first and second cavities and the sounding channel are configured to open radially to outside of the tyre, and
            each of the first and second sounding cavities and the sounding channel are configured to be closed by the ground surface in an airtight manner when a contact patch including the first and second sounding cavities and the sounding channel makes contact with the ground surface.

2. The tyre according to claim 1, wherein the first and second sounding cavities are axially aligned with one another.

3. The tyre according to claim 1, wherein the first and second sounding cavities are arranged axially in a central part of the contact patch.

4. The tyre according to claim 1, wherein
    the first and second sounding cavities and the sounding channel include a mouth defined by a contour formed on the tread strip,
    the contour is planar so that the first and second sounding cavities and the sounding channel can be closed in an airtight manner by the ground surface, and
    the ground surface is flat.

5. The tyre according to claim 1, wherein
    each of the first and second circumferential grooves has a predetermined depth when the tyre is new, the tread strip includes two ribs formed transversally in a bottom portion of each of the first and second circumferential grooves, the at least two ribs being of a predetermined height when the tyre is new, and the predetermined height being substantially equal to a difference between the predetermined depth of each of the first and second circumferential grooves and the predetermined wear threshold, and a distance separating the two ribs is smaller than a predetermined distance so that, beyond the predetermined wear threshold, cavities formed by the first and second circumferential grooves and delimited by the two ribs include the first and second sounding cavities.

6. The tyre according to claim 5, wherein the distance separating the two ribs is greater than 15 millimeters and less than 50 millimeters.

7. The tyre according to claim 1, wherein, beyond the predetermined wear threshold, a total volume of the first and second sounding cavities and the sounding channel is greater than or equal to 4 cm$^3$.

8. The tyre according to claim 1, wherein, beyond the predetermined wear threshold, a total volume of the first and second sounding cavities and the sounding channel is greater than or equal to 5 cm$^3$.

9. The tyre according to claim 1, wherein,
when the tyre is new, the first and second cavities are closed and embedded within a mass of the tread strip, and,
beyond the predetermined wear threshold, the first and second cavities are exposed and become the first and second sounding cavities connected by the sounding channel.

10. The tyre according to claim 1, wherein, beyond the predetermined wear threshold, the tread strip includes a plurality of pairs of sounding cavities and a plurality of sounding channels of identical shapes, each sounding cavity of a pair of sounding cavities being connected to each other by a corresponding sounding channel of the plurality of sounding channels.

11. The tyre according to claim 10, wherein, beyond the predetermined wear threshold, the plurality of pairs of sounding cavities and the plurality of sounding channels are evenly distributed along a circumference of the tyre.

12. The tyre according to claim 1, wherein, when the predetermined wear threshold is reached, at least two pairs of sounding cavities and at least two sounding channels are exposed on the tread strip.

13. The tyre according to claim 1, wherein, when the predetermined wear threshold is reached, at least four pairs of sounding cavities and at least four sounding channels are exposed on the tread strip.

14. A vehicle tyre comprising a tread strip,
wherein, when a predetermined wear threshold is reached:
the tyre includes first and second sounding cavities and a sounding cavity that are exposed on the tread strip,
each of the first and second sounding cavities is arranged respectively in a first circumferential groove and a second circumferential groove of the tread strip, the first and second sounding cavities being arranged respectively on first and second sides of a central median plane of the tyre,
the first and second sounding cavities are connected to each other by the sounding channel, which crosses the central median plane of the tyre,
each of the first and second cavities and the sounding channel are configured to open radially to outside of the tyre, and
each of the first and second sounding cavities and the sounding channel are configured to be closed by a ground surface in an airtight manner when a contact patch including the first and second sounding cavities and the sounding channel makes contact with the ground surface, and
wherein, before the predetermined wear threshold is reached, the contact patch includes no assembly of a pair of sounding cavities connected by a sounding channel.

15. The tyre according to claim 14, wherein, when the tyre is new, the contact patch includes no assembly of a pair of sounding cavities connected by a sounding channel.

16. A vehicle tyre comprising a tread strip,
wherein, when a predetermined wear threshold is reached:
the tyre includes first and second sounding cavities and a sounding channel that are exposed on the tread strip,
each of the first and second sounding cavities is arranged respectively in a first circumferental groove and a second circumferential groove of the tread strip, the first and second sounding cavities being arranged respectively on first and second sides of a central median plane of the tyre,
the first and second sounding cavities are connected to each other by the sounding channel, which crosses the central median plane of the tyre,
each of the first and second cavities and the sounding channel are configured to open radially to outside of the tyre, and
each of the first and second sounding cavities and the sounding channel are configured to be closed by a ground surface in an airtight manner when a contact patch including the first and second sounding cavities and the sounding channel makes contact with the ground surface,
wherein, when the tyre is new, a channel is closed and embedded within a mass of the tread strip, and
wherein, beyond the predetermined wear threshold, the channel becomes the sounding channel connecting the first and second sounding cavities.

\* \* \* \* \*